United States Patent [19]

Wells et al.

[11] 4,105,312
[45] Aug. 8, 1978

[54] CARRIAGE MECHANISM FOR MICROFICHE READER

[75] Inventors: Thomas R. Wells, Des Plaines, Ill.; Theodore E. Dahlen, West Bend, Wis.

[73] Assignee: Bell & Howell Company, Chicago, Ill.

[21] Appl. No.: 700,676

[22] Filed: Jun. 28, 1976

[51] Int. Cl.² ............................................. G03B 23/08
[52] U.S. Cl. ................................................ 353/27 R
[58] Field of Search ........................... 353/27 R, 27 A

[56] References Cited

U.S. PATENT DOCUMENTS

| | | | |
|---|---|---|---|
| 3,413,061 | 11/1968 | Simpson et al. | 353/27 R |
| 3,836,242 | 9/1974 | Kluver et al. | 353/27 R |
| 3,917,389 | 11/1975 | Shoji | 353/27 R |
| 3,967,890 | 7/1976 | Wells | 353/27 A |

*Primary Examiner*—Steven L. Stephan
*Attorney, Agent, or Firm*—Harry G. Thibault; Alan B. Samlan

[57] ABSTRACT

A microfiche reader has a carrier which includes means for transporting a microfiche film with a rectilinear movement. The carrier has two plates of glass for receiving a microfiche between them, one of the glass plates being hinged to raise and lower relative to the other. As the carrier moves to one extremity of its rectilinear movement, the cover glass automatically swings on its hinge pin to open and thereby enable manual access to the microfiche betwen the glass. Regardless of how far the carrier does or does not move, near the extremity of the movement, this glass opening device has an ability to life the cover glass to a position where its center of gravity closely approaches, but does not cross, the hinge pin.

7 Claims, 8 Drawing Figures

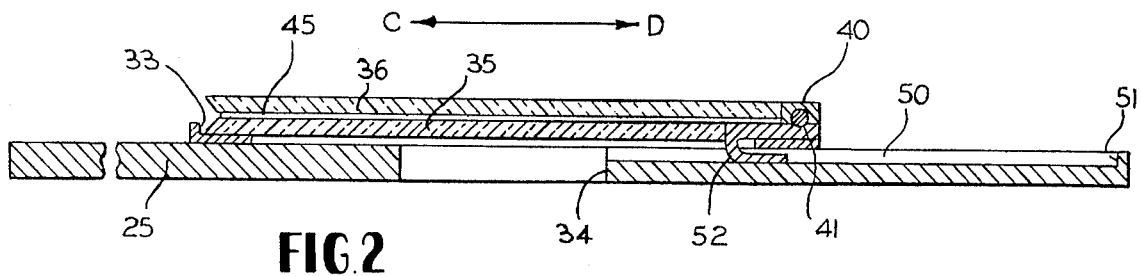
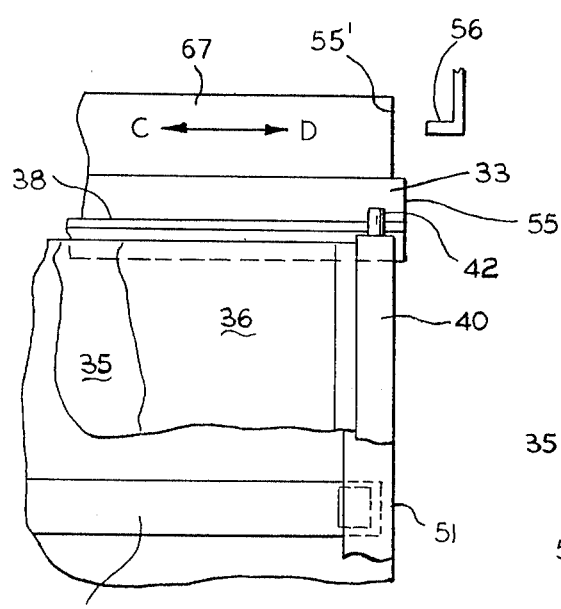
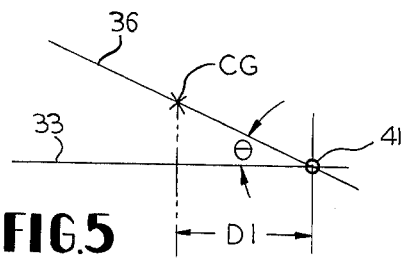
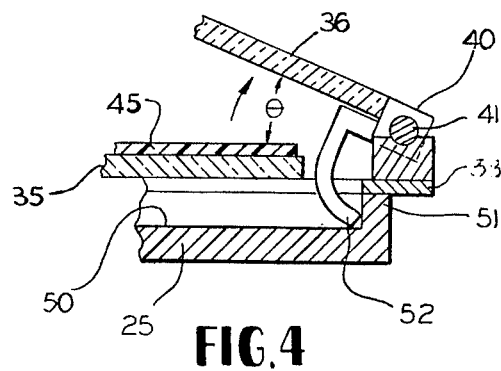
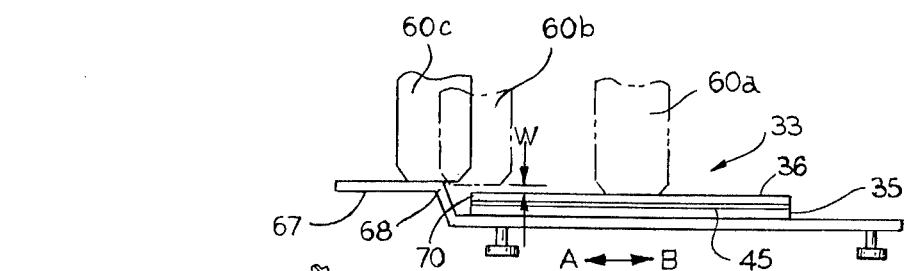
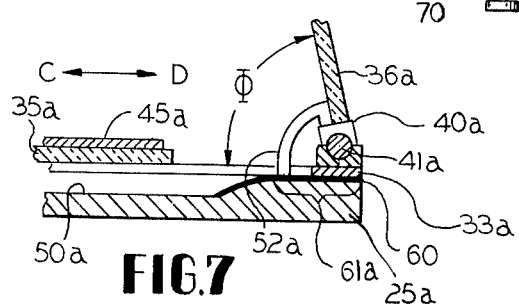
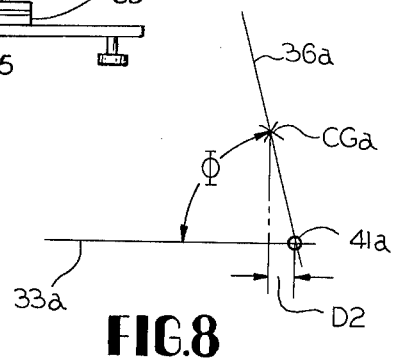

CARRIAGE MECHANISM FOR MICROFICHE READER

This application is related to copending application Ser. No. 532,801, filed Dec. 16, 1974, now U.S. Pat. 3,967,890.

This invention relates to microfiche readers and more particularly to microfiche carriers for selecting and projecting photocopied images.

Microfiche film is a known form of graphic data presentation wherein a number of pages are photographically reproduced on a single "card" of microfiche film (such as a 3 × 5 inch to 4 × 6 inch card, for example). Any suitable number (up to, say a thousand or so) of pages may be photographically formed in an orthogonal array on a single microfiche "card" of photographic film. The microfiche film may then be placed in a carrier of an optical reader. The carrier may be moved with a rectilinear motion until an image of a selected page is positioned in an optical projection path leading to a display screen.

Therefore, it should be apparent that a use of microfiche involves filing and storing in a library file, removal and mechanical manipulation of the microfiche, and then refiling in the library file. Each microfiche must be found in the library file with little or no search, and then returned to the same spot in the library file, for future reference. The mechanical manipulation of a microfiche involves sliding the microfiche into and out of the library file. Then, it is placed in the carrier of the reader, usually between a pair of spaced parallel glass plates. Next, the carrier is moved in X and Y directions, until an image selected from the orthongonal array is in the optical path of a projector. While the microfiche is out of the library file and in the carrier, it should be possible to remove and replace the microfiche between the glass plates in oder to clean or adjust the mirofiche. If the microfiche reader is either automatic or semi-automatic the glass plates should automatically open and close to give access to the microfiche whenever the carrier reaches an access position.

The pair of glass plates usually has a first plate firmly anchored to the carrier. The other plate is often hinged at one edge to move between opened and closed positions relative to the first plate. When the hinged plate is opened, it is convenient, and less expensive, to depend upon gravity to provide the force to move it back to the closed position. This means that the center of gravity of the opening plate must not move over the center formed by the hinge pin because gravity would then hold the hinged plate in its open position. Therefore, to be safe, designers have limited the opening of the hinged glass plate at a point where its center of gravity remains quite a distance away from the hinge pin. Thus, there is not doubt that, when released, the hinged plate will return to its closed position. However, when the hinged plate movement is so limited, it is difficult to remove the microfiche and the moments acting upon the hinge pin and other support members are transmitted through substantial length. Sometime, these moments are great enough to break the hinge pin or the support members.

When attempts have been made to further open the hinged plate, the device has tended to become overly critical and unpredictable. Sometimes the operation of the cover glass depends upon how far the carrier is moved. Therefore, the carrier had to be forced to the extremity of its position in order to open the cover glass far enough.

Accordingly, an object of the invention is to provide new and improved microfiche carriers, and particularly—although not exclusively—to automatically or semiautomatically opening carriers for use in cartridge loaded microfiche readers. In greater detail, an object is to enable microfiche film to be manually reloaded, replaced or cleaned after it is extracted from a cartridge, while it is in the carrier, and before it is returned into a cartridge. Here an object is to provide a mechanical device for automatically opening and closing the carrier as far as it is possible to do so without introducing either critical operations or nonstable positioning.

Yet another object of the invention is to provide a microfiche carrier for use in an automatic reader with a simple and obvious operation, which may be used by people who have no special training in the use of a microfiche reader. Here an object is to enable a casual patron of a public library, for example, to use the reader after only the simplest form of instructions.

In keeping with an aspect of the invention, these and other objects are accomplished by providing a microfiche carrier having a pair of glass plates, one of which is hinged to move between opened and closed positions. The hinged plate movement is caused by an operating finger following the contour of a cam at approximately the extremity of the carrier movement. The cam terminates in a flat portion so that the same amount of hinged plate movement occurs regardless of variations of carrier movement after the finger reaches the flat part of the cam. The opened position of the glass plate may be thus controlled with such precision that the hinged plate center of gravity may reliably and and stably approach the hinge pin much closer than was heretofore possible.

The nature of a preferred embodiment of the invention may be understood best by a study of the attached drawing wherein:

FIG. 2 is a side elevation view of a first embodiment in cross section (taken along line 2—2 of FIG. 1) and showing a mechanism for automatically raising or lowering the cover glass of the carrier depending upon whether or not the carrier is at one extremity of its rectilinear coverage motion;

FIG. 3 is a plan view of a fragment of a corner of the microfiche carrier of FIG. 2, which shows an interlock mechanism that enables the automatically raised cover glass at the extremity of the rectilinear motion;

FIG. 4 is a stop motion schematic view of the cover glass lifting mechanism of FIG. 2, as it operates at the extremity of the microfiche carrier movement;

Figure 1:
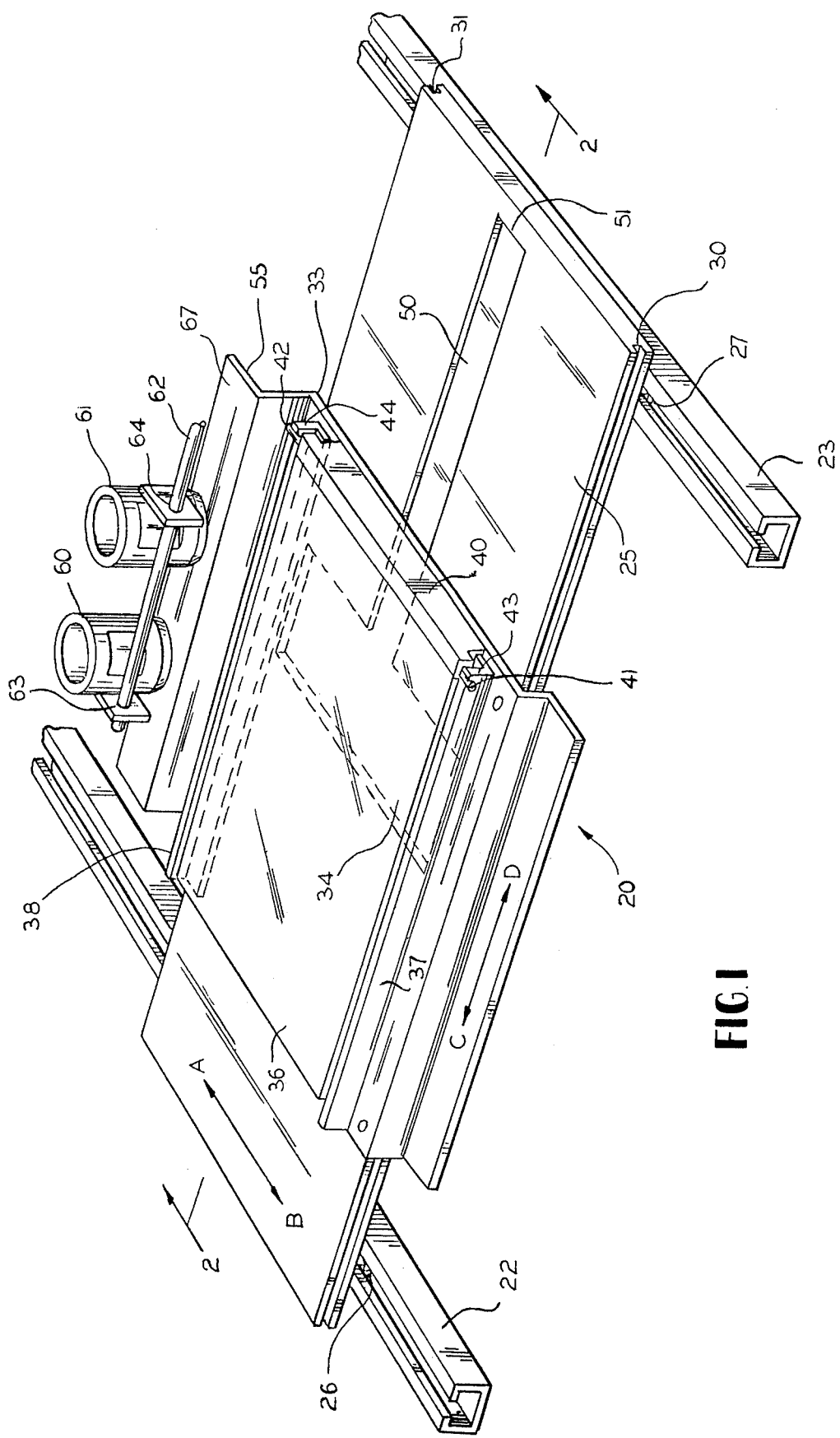
FIG. 1 is a perspective view of a microfiche carrier arranged for rectilinear motion and pair of image lens mounts in a position which is removed from the cover glass of the carrier.

FIG. 5 graphically illustrates the moment of FIG. 4 and the lever arms acting upon the hinge pin and supporting mechanism of the first embodiment of FIGS. 2–4;

FIG. 6 is a schematic diagram showing how the cover glass of the carrier may be removed from under an image forming lens holder without danger of chipping the edge of the cover glass;

FIG. 7 is a stop motion view, similar to FIG. 4, showing how a second embodiment enables the cover plate to open wider, to rest in a stable position, and to reduce criticality of the microfiche carrier positioning; and FIG. 8 is a graphical representation, similar to FIG. 5, showing the moments and the lever arms acting upon the hinge pin and supporting mechanism of the second embodiment of FIG. 7.

The inventive microfiche carrier 20 (FIG. 1) may be mounted on a track comprising a spaced parallel pair of guide rails 22, 23 extended transversely across the top of a base unit forming part of a microfiche reader (not shown). A rectangular lower carrier 25 has four wheels (two of which are numbered 26, 27) which roll in the rails 22, 23. Hence, lower carrier 25 may be manually pushed back and forth in directions A and B. The lower carriage 25 includes a second track comprising spaced parallel pair of rails 30, 31, which are perpendicular to rails 22, 23. A rectangular upper carrier 33 rolls back and forth in directions C and D on wheels rolling in rails 30, 31. The lower carrier 25 contains a cut out portion 34 which enables passage of a light beam for prjecting a microfiche image. Accordingly, it should now be apparent that the upper carrier 33 may be moved to almost any spot, in rectilinear or X and Y directions, which is within the movement provided by the rails 22, 23, 30, 31.

A pair of glass plates 35, 36 are mounted on the upper carrier 33. In greater detail, the lower glass plate 35 lies between spaced parallel side rails 37, 38 and is anchored on the top of the upper carrier 33. A hinged upper plate 36 is cemented to a hinge member 40 having opposed hinge pins 41, 42 which rest in bearings 43, 44 formed in the side rails 37, 38. Hence, the upper glass plate swings on hinge pins 41, 42 and may be lifted to an open position or lowered to a closed position. A microfiche 45 (FIG. 2) may be placed between it and the lower glass plate. It should now be apparent how the microfiche is placed between the two glass plates 35, 36 and moved to any desired position defined by the rectilinear rails 22, 23, 30, 31.

Means are provided for opening the glass plates at one extremity of carriage motion. More particularly, the lower carriage 25 (FIG. 2) includes a fairly thick plate having a slot 50 milled therein, extending almost to the end thereof, where the slot stops at an upstanding wall 51 in the embodiment of FIGS. 2–6. Upon inspection of FIG. 2, it will be seen that a hook 52 is dependent from and integral with the hinge member 40. The depth of slot 50 is such that this hook normally clears the bottom of the slot 50 as the carrier moves back and forth in directions C, D.

From an inspection of FIGS. 3, 4 the upper carrier 33 is able to move in direction D until an edge 55 strikes a portion 56 of the microfiche reader housing. At this point in the rightward movement of carrier 33, hook 52 remains in slot 50 and has not yet contacted upstanding wall 51. This interlock structure prevents upper glass plate 36 from pivoting upward while carrier 33 remains beneath lenses 60, 61, or any part of housing 56.

By moving carrier 33 forward, as viewed in FIG. 3, edge 55 becomes free of housing portion 56, which is now positioned to engage indented edge 55' of the carrier, thus enabling the carrier to move slightly further to the right. Upon continued movement in diection D, hook 52 engages the upstanding wall 51 at the end of slot 50. This raises the hinged upper glass 36 through an angle θ (FIG. 4) which is far enough to enable the removal and replacement of the microfiche 45, between the glass plates. When the upper carrier 33 is again moved in direction C, the hook 52 moves away from the wall 51 and the glass 36 is automatically lowered.

This first embodiment of FIGS. 2–4 functions very well; however, it does present some problems (illustrated in FIG. 5), which should be considered when the design is implemented. First, the angle θ tends to be restricted so that the cover glass does not lift as high as it could lift. Thus, there is a slightly awkward feel to the insertion and removal of the microfiche 45. Second, the glass plates 36 tend to be quite heavy, relative to other parts. Therefore, substantial weight acts downwardly from the center of gravity CG of plate 36, at a point which is removed a substantial distance D1 from the hinge pin 41. This weight acts upon upstanding wall 51 with forces which are multiplied by the lengths of the lever arms formed by the distance D1 as compared to the length of the finger 52. Therefore, the wall 51 tends to be battered and the finger 52 might break unless it is made strong enough to withstand both the repeated battering and the force of the heavyweight acting downwardly from the center of gravity.

Of course, one solution to the foregoing problems is to make all of the parts sufficiently massive to function. However, this tends to require more material than is really necessary and it results in a somewhat bulky structure.

A second embodiment of the invention (FIGS. 7 and 8) resolves these problems. This embodiment uses the same reference numerals (with the suffix letter "a") that are used in FIG. 4 to identify corresponding parts.

The end wall 51 of FIG. 4 is replaced by a raised platform having a cam contour 60, which is outlined in a heavily inked line, for easy identification. The end of finger 52a follows this contour 60 as the cover glass 36a lifts to an upright position.

The cam 60 comprises an inclined plane which terminates in a flat horizontal guide part 61a, after which the cover glass ceases to lift further. Then, the carrier 33a merely slides back in direction D, with no jarring jolt. The carrier 33 may be constructed to interfer with some other structural part of the reader (as at 56, FIG. 3) and thereby limit the travel of the carrier, without imposing any battering or stopping forces upon the finger 52a.

The length of finger 52a is adjusted so that the cover glass 36a stands up with an angle Φ which is substantially greater than the angle θ of FIG. 4. This means that it seems much less awkward to remove and replace the microfiche. Also, the center of gravity CGa (FIG. 8) of the opened glass plate rests at a much closer distance D2 to the hinge pin 41. Nevertheless, the stability of the glass plate may be controlled with such precision that it cannot pass over the center line formed by the hinge pin 41. Thus, cover glass 36a reliably closes under the force of gravity when the carrier 33a moves in direction C.

It is important that the upper carrier should provide means for insuring a proper focus despite loose manufacturing tolerances. Briefly, all mechanical parts are certain to have some manufacturing tolerances. The looser the tolerances, the lower the cost. Therefore, it is desirable for the image lenses (which rest in lens carriers 60, 61—FIG. 1) to have a focal length which is independent of these tolerances. A moment's reflection makes it clear that the image lens carriers 60, 61 will insure such a focus if they ride freely upon the top of the cover glass plate. The sides of the glass are exactly parallel. The thickness of the glass is dependably accurate. The microfiche 45 is held firmly against the underside of the glass 36. Hence, the image lenses in lens carriers 60, 61 and the microfiche always have the same spacial relationship if the lens carriers merely float on the top of the glass 36.

For the foregoing reasons, the lens mounts preferably sit loosely in sockets on a suitable housing support (not shown). A focusing rod 62 is supported by bearings 63, 64 in plates which are integral with the loose lens mounts. This rod 62 is free from any rigid alignment with the reader housing which allows the focusing rod 62 to tip to any position loosely fixed by the bearings and therefore to be parallel with the top surface of the cover glass 36. The bottom (FIG. 6) of the lens mounts (e.g., 60) is rounded or otherwise shaped to enable the lens to glide smoothly over the upper surface of cover glass 36, as the carrier is moved to locate the microfiche image in the optical path.

Accordingly, a shelf 67 (such as stainless steel) is formed on the back of the upper carrier 33 to receive and support the lens mounts 60, 61 when the carrier is moved the maximum allowable distance in direction B. More specifically, at the position 60a (FIG. 6), the lens mounts 60, 61 rest upon and slide over the surface of glass plate 36 as it is moved to locate a microfiche image. As the carrier 33 is pulled in direction B, the lens mount engages the shelf point 68. The edges between the shelf 67 and the lens mount at 68 are in the shape of mutually inclined planes. Thus, the lens mount is lifted (as indicated at W) to the position 60b before it passes completely off the edge of glass 36. Finally, the carrier reaches the outward extremity of its movement in direction B and the lens mount is resting upon the stainless steel shelf 67. The microfiche carrier glass plate 36 may now be lifted in any suitable manner. The microfiche may be removed, cleaned, replaced or otherwise adjusted. Then the carrier 33 is pushed back in direction A and the lens mount 60 returns over the path indicated by the three stop motion positions 60a, 60b, 60c.

It should be noted that as the lens mount 60 crosses the edge 70 of the glass plate 36, it is lifted, by the distance W, away from the glass surface. Hence, the edge of the glass is never touched by the sliding lens mount.

Those who are skilled in the art will readily perceive how various modifications may be made within the scope and the spirit of the invention. Therefore, the appended claims are to be construed to cover all equivalent structures.

We claim:

1. A microfiche film carrier comprising means for enabling said carrier to travel over a mutually perpendicular set of tracks with a rectilinear movement, each of said set of tracks including a spaced parallel pair of rails, a pair of spaced parallel glass plates mounted on said carrier to travel with said carrier over said rectilinear movement, one of said glass plates being hinged at one end to move between raised and lowered positions, operator finger means rigidly attached to said hinged glass plate and effective at one extremity of said movement for automatically lifting one of said glass plates, and cam means intermediate said rails forming one set of tracks with an inclined plane followed by a flat horizontal guide portion for guiding and directing said operator finger on said glass plate as it raises and lowers on said hinge, said inclined plane cooperating with said finger to raise said glass plate, said flat horizontal guide portion cooperating with said operator finger for enabling said glass plate to stand in a stable, substantially upright, slightly leaning position, with the center of gravity resting near said hinge, said glass plate standing stably as it moves along the entire length of the flat horizontal guide portion independently of the exact amount of said movement near the extremity of said movement, whereby the weight of said leaning plate rests upon and is supported by said hinge and the tip of said finger with the center of gravity of said glass plate resting close to said hinge, and on the side of said hinge where said finger is located.

2. The carrier of claim 1 wherein there is an upper carrier and a lower carrier each having wheels mounted on said rails, said automatic lifting means including said operator finger which is in the form of a dependent hook means on said upper carrier, and said cam being formed on said lower carrier for engaging said hook.

3. The carrier of claim 2 wherein said hook is attached to the hinge between said one of said pair of said glass plates and said upper carrier, and said cam means is formed at the end of a slot through which said hook travels during said movement, said hook engageing said cam and articulating said hinge.

4. The carrier of claim 3 wherein the relative dimensions of said cam and said hook are such that the center of gravity of said cover plate approaches, but does not cross the line of said hinge.

5. The carrier of claim 1 wherein there is an upper generally rectangular carrier mounted on a generally rectangular lower carrier, each of said rectangular carriers having wheels on the corners thereof mounted on said rails, one set of said rails being mounted on a microfiche reader, the other of said set of rails being mounted on said lower carrier, said operator finger means including a dependent hook means on said upper carrier, and said lower carrier including a slot terminating in said cam for engaging said hook, said engagement of said hook and said cam lifting said glass.

6. The carrier of claim 5 said hinge being affixed to the upper most one of said pair of glasses, said hook being integrally movable with said hinge, said slot having a depth which receives said hook so that it may move therein without effect upon said hinge, said hook being shaped and positioned to engage said cam at the end of said slot whereby said hook moves through said slot, engages said cam and articulates said hinge with tolerance of movement being provided by the movement of said hook along the flat portion of said cam.

7. The carrier of claim 6, and means at an extremity of the carriage motion where said hook engages said cam terminating said slot for limiting carriage movement independently of the interaction of said hook and cam.

* * * * *